(12) United States Patent
Jenkins

(10) Patent No.: US 7,676,983 B2
(45) Date of Patent: Mar. 16, 2010

(54) ROD AND TACKLE CARRYING CASE

(76) Inventor: Lloyd J. Jenkins, 3796 Old Lloyd Rd., Monticello, FL (US) 32344

( * ) Notice: Subject to any disclaimer, the term of this patent is extended or adjusted under 35 U.S.C. 154(b) by 954 days.

(21) Appl. No.: 11/204,671

(22) Filed: Aug. 16, 2005

(65) Prior Publication Data

US 2007/0039231 A1    Feb. 22, 2007

(51) Int. Cl.
*A01K 97/10* (2006.01)
*A01K 97/08* (2006.01)

(52) U.S. Cl. .............. 43/21.2; 43/26; 43/54.1; 248/512

(58) Field of Classification Search ........... 43/21.2, 43/54.1, 55, 56, 26; 248/511, 512, 519, 523, 248/539
See application file for complete search history.

(56) References Cited

U.S. PATENT DOCUMENTS

| | | | |
|---|---|---|---|
| 2,591,674 A | | 4/1952 | Chalker |
| 3,674,190 A | | 7/1972 | Wright |
| 4,311,262 A | | 1/1982 | Morin |
| 4,628,628 A | | 12/1986 | Burgin et al. |
| 4,845,881 A | * | 7/1989 | Ward ............... 43/21.2 |
| 5,092,463 A | * | 3/1992 | Dees ............... 206/373 |
| 5,137,319 A | | 8/1992 | Sauder |
| 5,188,243 A | * | 2/1993 | Ruiz ............... 211/70.2 |
| 5,271,520 A | * | 12/1993 | McAfee ........... 220/529 |
| 5,305,542 A | * | 4/1994 | Phelps ............ 43/21.2 |
| 5,319,877 A | * | 6/1994 | Hagan ............ 43/54.1 |
| 5,366,076 A | | 11/1994 | Lyles |
| D361,219 S | * | 8/1995 | Luymes ........... D6/432 |
| 5,450,688 A | | 9/1995 | Hall |
| 5,471,103 A | * | 11/1995 | Fujii ............... 310/81 |
| 5,678,348 A | | 10/1997 | Zielinski et al. |
| D394,575 S | * | 5/1998 | Mikloczak et al. ....... D6/552 |
| 5,755,057 A | * | 5/1998 | Dancer ............ 43/54.1 |
| 5,971,333 A | * | 10/1999 | Fiedor ............. 248/129 |
| 6,209,721 B1 | * | 4/2001 | Sharpe et al. ....... 206/315.6 |
| 6,254,055 B1 | | 7/2001 | Lamberson, Jr. |
| 6,364,150 B1 | | 4/2002 | Persinger |
| 6,729,066 B1 | | 5/2004 | Howley |
| 6,883,268 B2 | | 4/2005 | Fraser |

FOREIGN PATENT DOCUMENTS

JP          9-70311      *    3/1997

OTHER PUBLICATIONS

Bound 4: 1 & 2, Merriam-Webster's Collegiate Dictionary 135 (10th ed. 1999).*

* cited by examiner

*Primary Examiner*—David J Parsley
(74) *Attorney, Agent, or Firm*—J. Wiley Horton

(57) ABSTRACT

A carrying case for transporting fishing equipment from one location to another. The carrying case generally comprises an external container and an insert insertedly situated within the external container. The external container is substantially cylindrical in shape with an open top and a closed bottom. The insert includes a lid, a base, and a support connecting the lid to the base. A plurality of cutouts are provided in the lid of the insert for receiving the shafts of a plurality of fishing rods. A plurality of seats are provided along the base of the insert for receiving the handles of the fishing rods. A storage space is also provided between the base of the insert and the base of the external container for storing other fishing equipment including fishing tackle. A series of ribs are provided along the walls of the external container near the base of the external container for mating with the base of the insert.

6 Claims, 6 Drawing Sheets

ROD AND TACKLE CARRYING CASE

BACKGROUND OF THE INVENTION

1. Field of the Invention

This invention relates to the field of fishing equipment. More specifically, the present invention comprises a multi-functional rod and tackle carrying case.

2. Description of the Related Art

Transporting fishing equipment from one location to another can be an unpleasant experience for many people. Many people carry multiple fishing rods and a broad assortment of fishing tackle with them on fishing expeditions. To transport the equipment from one location to another, a person typically will carry the rods bunched together in one hand and a separate box storing the assortment of tackle in the other hand. This method can cause the lines to be become tangled, and in some cases it can even cause the rods and reels to become damaged. In addition, since both hands are full of equipment, the carrier typically must set some of the equipment down when the carrier needs to use their hands for another task.

Several devices are available for carrying multiple fishing rods, but these available devices have significant limitations. For example, these devices generally do not provide useful storage for fishing tackle. A person using these devices still may need to use both hands to carry all of their fishing equipment. In addition, many of the available devices do not allow for easy on-the-fly rod substitutions. The rod attachment mechanisms are overly complex or do not otherwise allow easy access to the fishing rod. Accordingly it would be desirable to have a carrying case that is easy to use, allows on-the-fly rod substitutions, and is capable of being carried in one hand.

BRIEF SUMMARY OF THE PRESENT INVENTION

The present invention comprises a carrying case for transporting fishing equipment from one location to another. The carrying case generally comprises an external container and an insert insertedly situated within the external container. In the preferred embodiment, the external container is substantially cylindrical in shape with an open top and a closed bottom. The insert includes a lid, a base, and a support connecting the lid to the base. A plurality of cutouts are provided in the lid of the insert for receiving the shafts of a plurality of fishing rods. A plurality of seats are provided along the base of the insert for receiving the handles of the fishing rods. These seats are in substantial vertical alignment with the cutouts in the lid. A storage space is also provided between the base of the insert and the base of the external container for storing other fishing equipment including fishing tackle. In the preferred embodiment, a series of ribs are provided along the walls of the external container near the base of the external container for mating with the base of the insert. Attachment mechanisms such as latches are provided on the lid of the insert and the top of the external container so that the insert and external container can be fastened together for transport. A handle is provided on the top of the lid of the insert to assist the user in transporting the carrying case and removing the insert from the external container.

REFERENCE NUMERALS IN THE DRAWINGS

| 10 | carrying case  | 12 | external container |
|----|----------------|----|--------------------|
| 14 | insert         | 16 | cutouts            |
| 18 | handle         | 20 | fastener           |
| 22 | rods           | 24 | internal ribs      |
| 26 | lid            | 28 | base               |
| 30 | seats          | 32 | latch receiver     |
| 34 | latch          | 36 | support            |
| 38 | strap          | 40 | base               |
| 42 | storage space  | 44 | line               |
| 46 | foam support   | 48 | slit               |

DETAILED DESCRIPTION OF THE INVENTION

Figure 1:
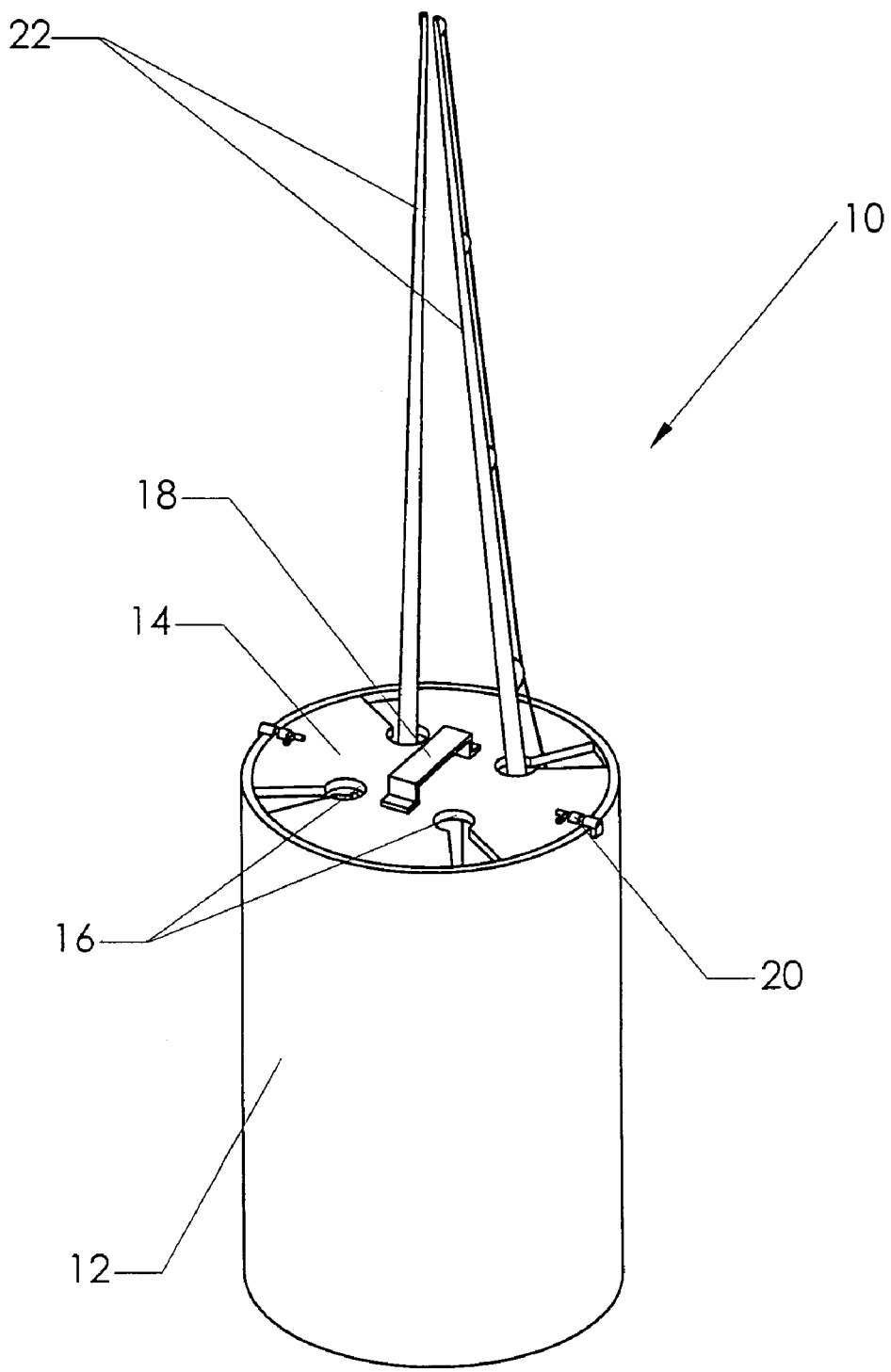
FIG. 1 is a perspective view, showing the present invention.

The preferred embodiment of the present invention, carrying case 10, is illustrated in FIG. 1. Carrying case 10 is generally composed of insert 14 which is insertedly situated within external container 12. In the preferred embodiment external container 12 is substantially cylindrical in shape with an open top and a solid base. Insert 14 has cutouts 16 placed around the perimeter of the lid. Cutouts 16 are designed to receive the shafts of rods 22 when rods 22 are placed in insert 14 as will be shown in greater detail subsequently. Attachment mechanisms, fastener 20 as exemplified in FIG. 1, are provided on the lid of insert 14 and the top of external container 12 so that insert 14 can be removably attached to external container 12 for transport. Handle 18 is provided atop insert 14 to assist the user in transporting carrying case 10 or removing insert 14 from external container 12.

Figure 2:
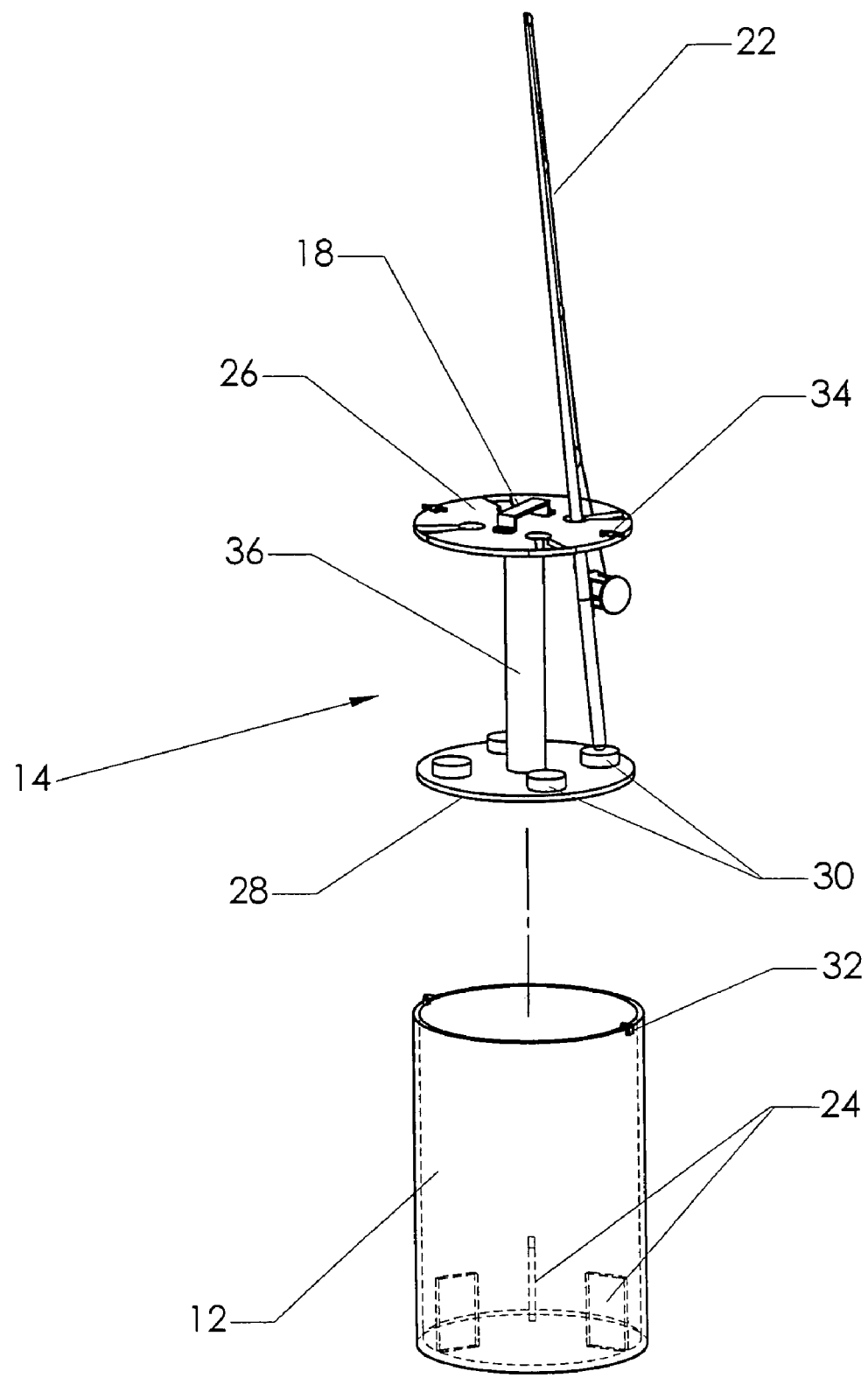
FIG. 2 is an exploded view, showing the present invention.

An exploded view is provided in FIG. 2 to better illustrate the components of the present invention. Insert 14 generally includes lid 26 and base 28 which are connected by support 36. As mentioned previously, lid 26 has a plurality of cutouts 16 placed around the perimeter. Base 28 has a plurality of seats 30 for receiving the handles of the fishing rods. Each of seats 30 is positioned to be substantially vertically aligned with a cutout 16. As illustrated in FIG. 2, rod 22 rests on seat 30 and the shaft of rod 22 is received within cutout 16. A pair of latches 34 are provided on the top of lid 26 so that insert 14 can be attached to external container 12 for transport. Handle 18 is provided on top of lid 26 to assist the user in transporting carrying case 10 from one location to another and can be used to separate insert 14 from external container 12 when desired.

External container 12 has a closed base, an open top, and a cylindrical wall extending from the base to the top. External container 12 has a pair of latch receivers 32 placed near the top of external container 12. Latch receivers 32 receive latches 34 when latches 34 are in the fastened position. Internal ribs 24 are provided along the inside of the wall of external container 12. Internal ribs 24 mate with base 28 of insert 14 when insert 14 is insertedly situated within external container 12. Although internal ribs 24 are illustrated in a vertical orientation along the wall of external container 12, internal ribs 24 can also be positioned horizontally. For example a single rib could be provided around the inside perimeter of the wall of external container 12.

Figure 3:
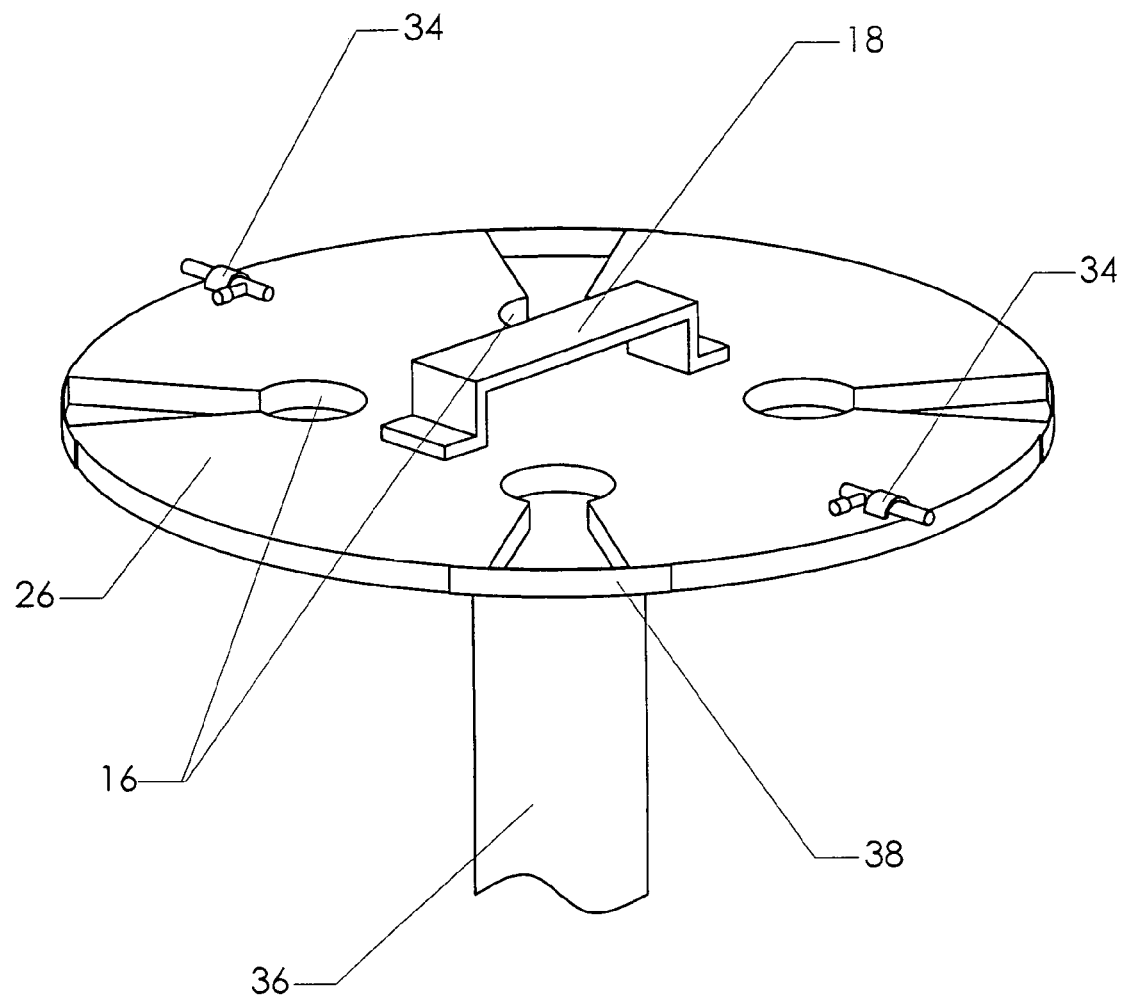
FIG. 3 is a perspective view, showing the lid of the insert.

FIG. 3 shows a perspective view of the top of lid 26. As mentioned previously, a pair of latches 34 are provided on opposite sides of lid 26 for attaching insert 14 to external container 12. The viewer will appreciate that cutouts 16 are provided along the perimeter of lid 26 so that an opening is provided in the perimeter and the shaft of the fishing rod can easily slide into cutout 16. Straps 38 are provided to close the opening in cutout 16 once the fishing rod is positioned in insert 14. Straps 38 can be made of canvas or some other durable material and attached on either side of the opening to cutout 16. Although straps 38 are shown on the outside edge of lid 26, the reader will appreciate that straps 38 can also be placed on the top of lid 26. In the preferred embodiment, straps 38 are permanently attached to one side of the opening and a removable fastener such as VELCRO is used on the other side to allow straps 38 to be easily fastened and unfastened.

Figure 4:
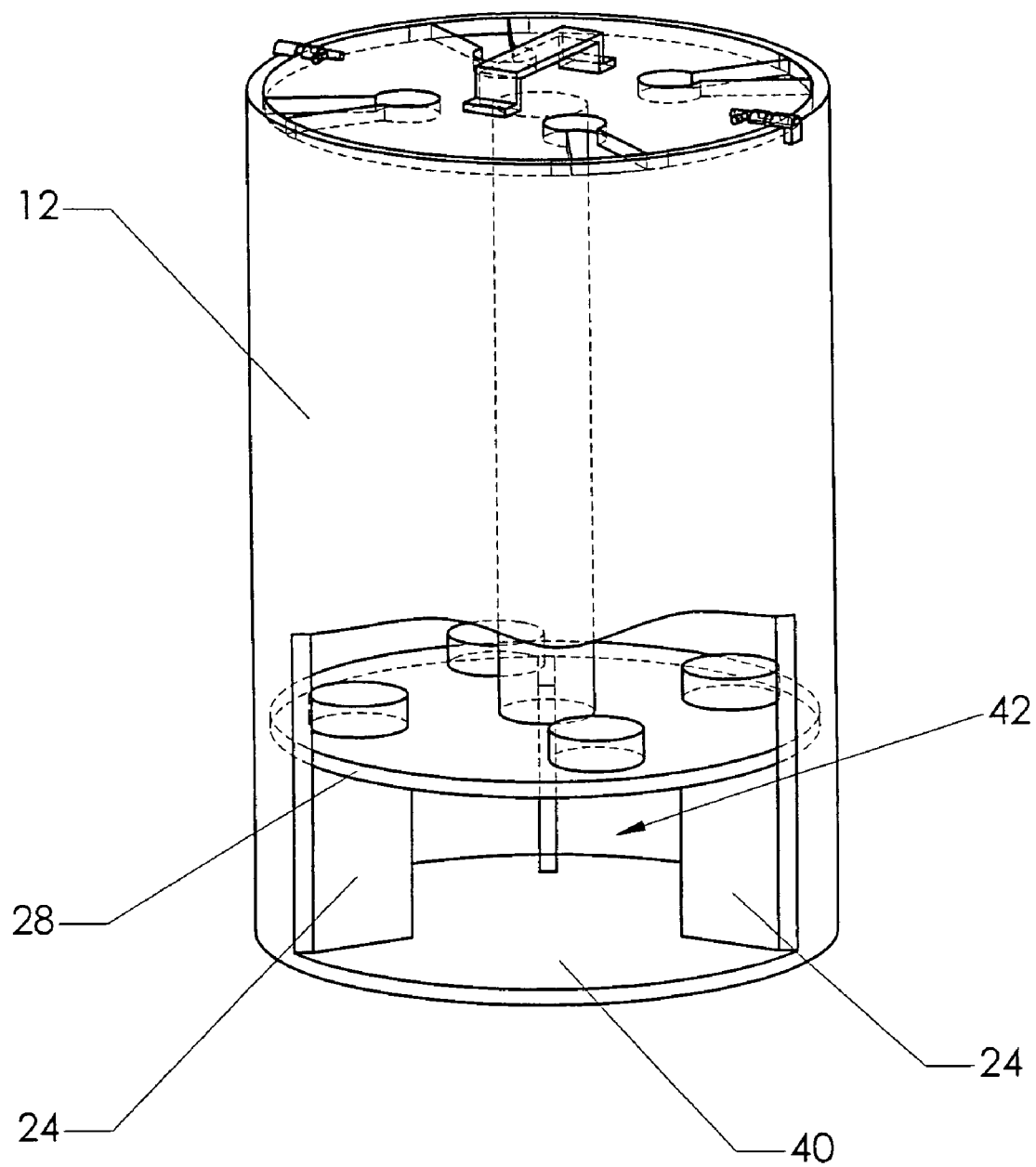
FIG. 4 is a cut-away view, showing the present invention.

FIG. 4 provides a cutaway view of carrying case 10 to better illustrate its storage characteristics. When insert 14 is insertedly situated within external container 12 as shown, base 28 of insert 14 mates with internal ribs 24. Storage space 42 is created between base 28 of insert 14, base 40 of external container 12, and the wall of external container 12. Storage space 42 can be used for transporting other fishing equipment such as fishing tackle and knives.

Insert 14 can be removed from external container 12 while fishing to provide the user with easier access to other rods. Base 28 of insert 14 is sufficiently wide to allow insert 14 to be set on the ground without the weight of rods 22 causing insert 14 to fall over. Supports can also be provided along the bottom of base 28 to stabilize the base when it placed on the ground. The reader will appreciate that the separable and free-standing nature of insert 14 allows the user to easily make on-the-fly substitutions as needed. The user simply unfastens strap 38, and removes the desired rod from insert 14. The other rod can be placed back in insert 14 and strapped into place.

Figure 5:
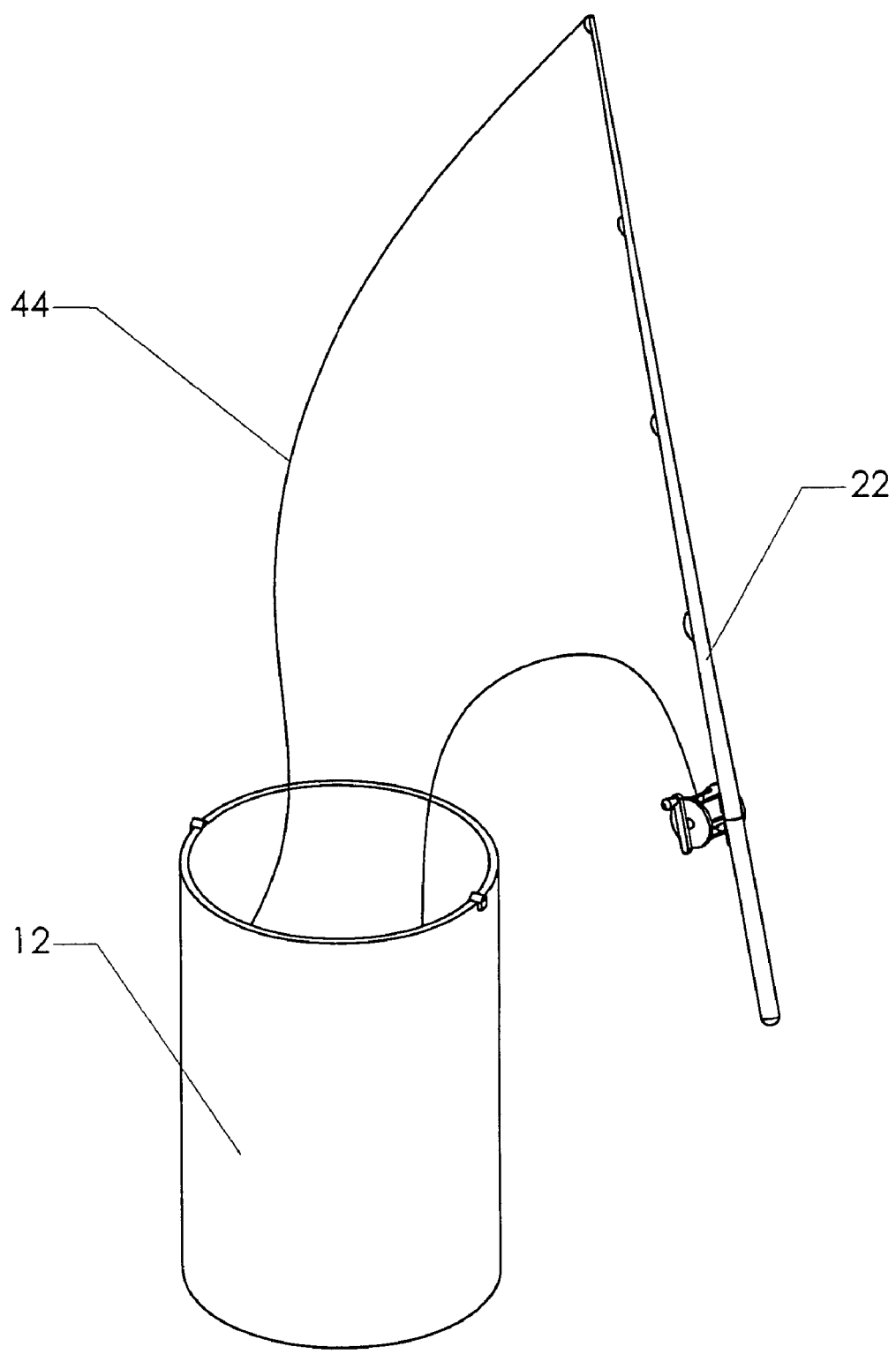
FIG. 5 is a perspective view, showing an alternate use of the present invention.

FIG. 5 illustrates an alternate use for external container 12 when insert 14 is removed. Those who fly fish know that it is often desirable to let out a significant amount of slack in the line while casting. Often times the fishing line is spooled off the reel and allowed to collect in a pile on the ground or in the water. This slack can be both a tripping hazard and can cause the line to get tangled. As shown in FIG. 5, external container 12 can be used to store the slack of line 44 when casting. This helps prevent the user from tripping over the line and helps prevent the line from becoming tangled.

Figure 6:
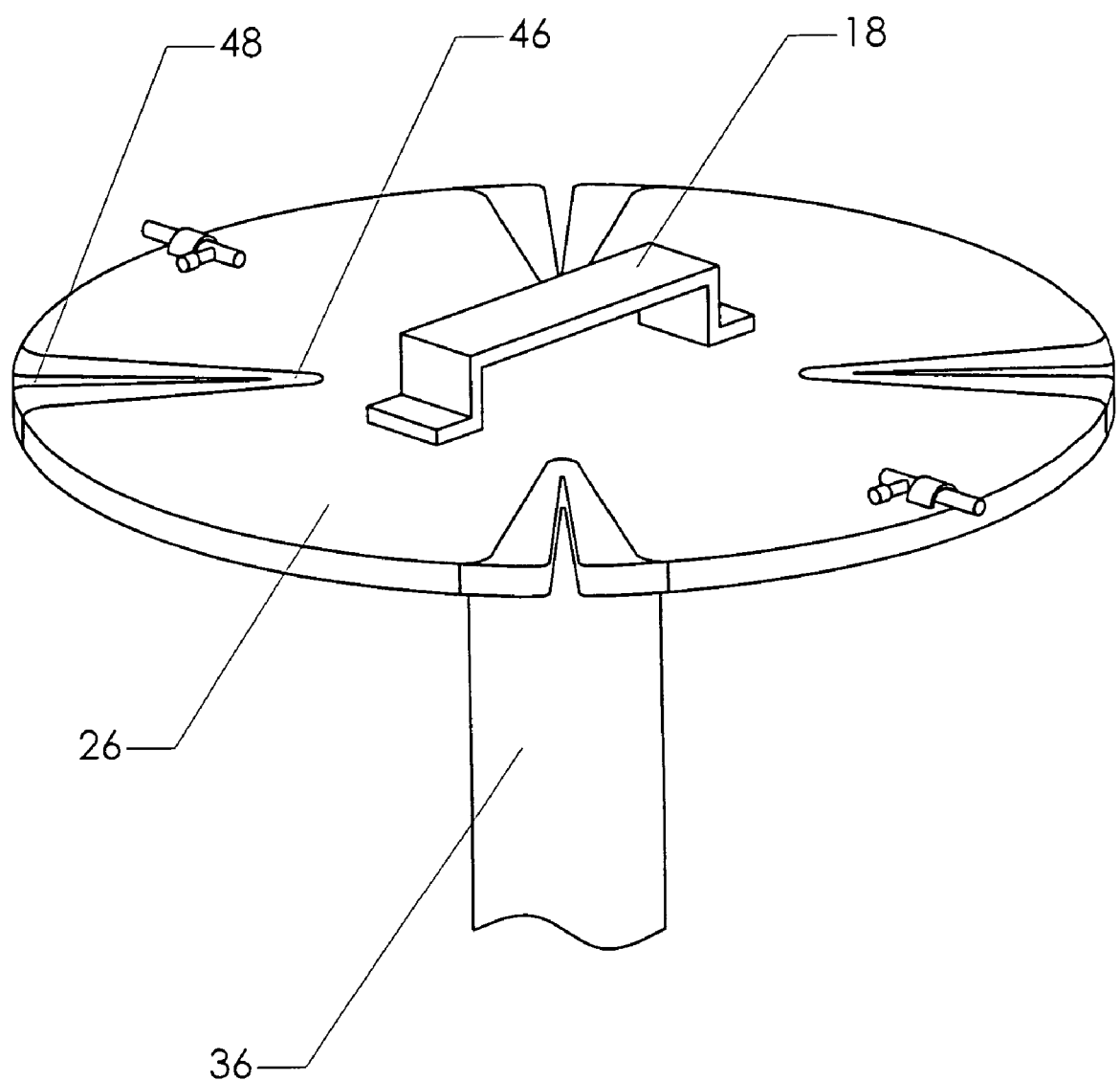
FIG. 6 is a perspective view, showing an alternate embodiment of the present invention.

Although the preceding descriptions contain significant detail they should not be viewed as limiting the invention but rather as providing examples of the preferred embodiments of the invention. For example, cutouts 16 can be made in many different shapes and forms. As shown in FIG. 6, the cutout in lid 26 can include foam support 46 for frictionally retaining the shaft of the rod within slit 48. Foam support 46 may be adhesively attached within the cutout, although other methods of attachment can be used. Other mechanisms besides foam support 46 and straps 38 can be used to hold the rods in cutouts 16. In addition, many different attachment mechanisms can be used to fasten insert 14 to external container 12. These variations do not depart from the spirit and scope of the invention. Accordingly, the scope of the invention should be determined by the following claims, rather than the examples given.

Having described my invention, I claim:

1. A carrying case for transporting a user's fishing equipment, said fishing equipment including a plurality of vertically oriented fishing rods with attached reels, comprising:
   a. an external container having a solid base, an open top, and a wall extending from said solid base to said open top, said wall having an inside face and an outside face;
   b. an insert configured to insert into said open top of said external container, said insert further including
      i. a lid, said lid having a top, a bottom, a perimeter and a plurality of cutouts in said perimeter, with each cutout configured to receive a shaft of one of said fishing rods;
      ii. a base, said base having a top and a bottom; and
      iii. a support, said support attaching said lid to said base of said insert, said support being configured so that said reels attached to said rods can fit between said support and said wall of said external container;
   c. at least one rib, position to lie between said external container and said insert when said insert is placed into said external container;
   d. a storage space, said storage space bounded by said base of said external container, said base of said insert, and said wall of said external container when said insert is situated within said external container, with said base of said insert being separated from said base of said container by said at least one rib;
   e. a latch for removably attaching said insert to said external container, said latch having an attached state and a detached state, whereby when said insert is attached to said external container, said lid of said insert lies within said open top of said container; and
   f. a handle extending upward from said lid, with said handle being positioned over a center of said lid, said handle and latch being configured such that when said latch is in said attached state lifting up on said handle will lift said external container, said insert, and anything stored therein, and when said latch is in said detached state, lifting up on said handle will pull said insert out of said external container, along with any of said fishing rods attached to said insert.

2. The carrying case of claim 1, said top of said base of said insert further comprising a plurality of seats with each of said seats being configured to receive a handle of one of said fishing rods.

3. The carrying case of claim 1, said top of said base of said insert further comprising:
   a. a seat for receiving a handle of one of said fishing rods, said seat positioned in substantial vertical alignment with one of said cutouts in said lid; and
   b. a second seat for receiving a handle of another of said fishing rods, said second seat positioned in substantial vertical alignment with a second of said cutouts in said lid.

4. The carrying case of claim 1, said inside of said wall of said external container comprising said at least one rib, said at least one rib configured to mate with said bottom of said base of said insert when said insert is placed within said external container.

5. The carrying case of claim 1, wherein each of said cutouts is positioned along said perimeter of said lid and forms an opening in said perimeter, said opening having a first side and a second side.

6. The carrying case of claim 5, wherein each of said cutouts includes a strap having a first end and a second end, said first end of said strap configured to attach to said lid proximal to said first side of said opening, and said second end of said strap configured to removably attach to said lid proximal to said second side of said opening so that said strap spans said opening when said second end of said strap is attached to said lid.

* * * * *